UNITED STATES PATENT OFFICE.

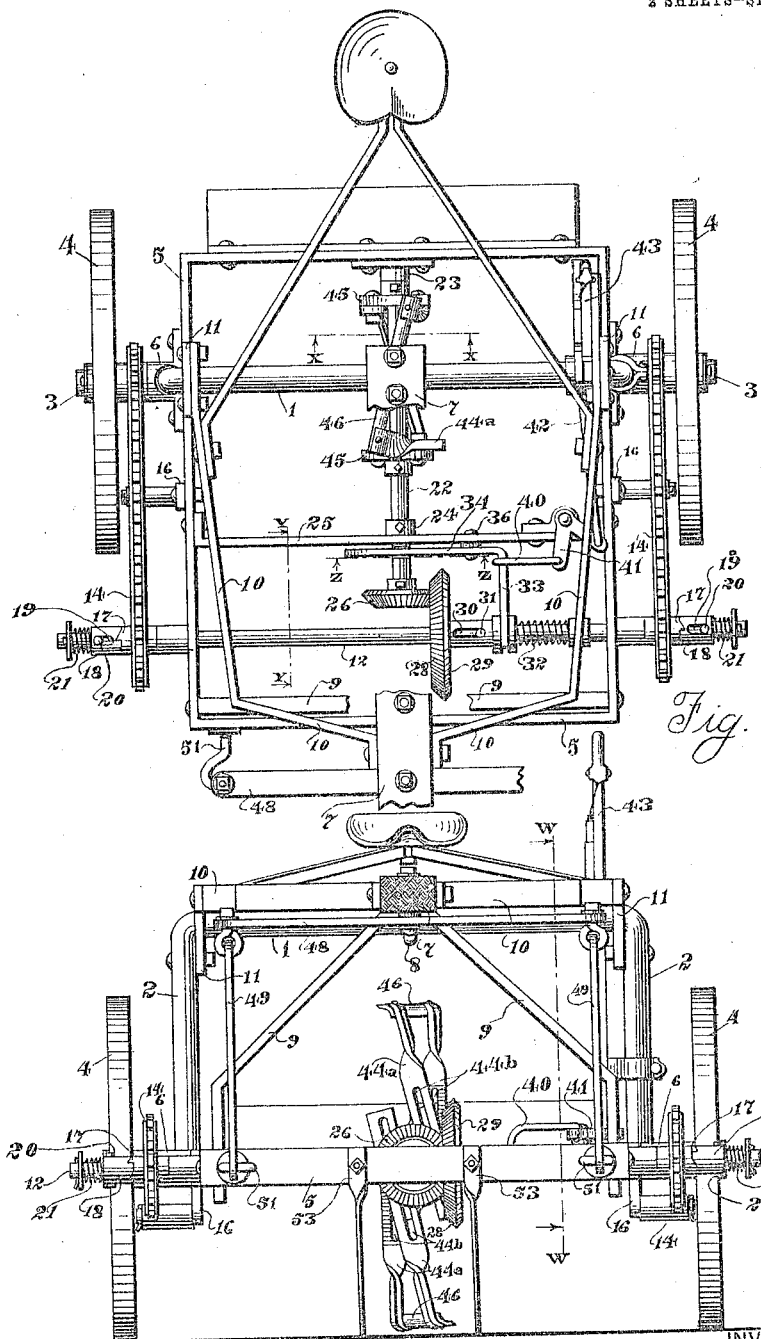
M. A. CRUM.
COTTON CHOPPER.
APPLICATION FILED JULY 14, 1913. RENEWED AUG. 22, 1914.
1,123,699.
Patented Jan. 5, 1915.

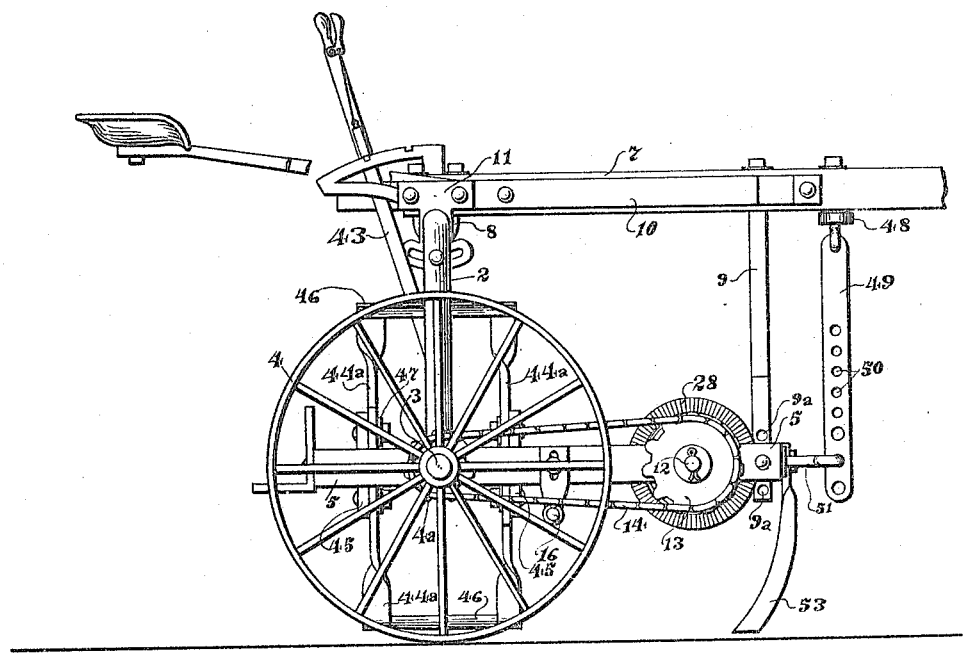

MARTIN A. CRUM, OF GRANBURY, TEXAS.

COTTON-CHOPPER.

1,123,699.   Specification of Letters Patent.   Patented Jan. 5, 1915.

Application filed July 14, 1913, Serial No. 778,836. Renewed August 22, 1914. Serial No. 858,132.

*To all whom it may concern:*

Be it known that I, MARTIN A. CRUM, a citizen of the United States, residing at Granbury, in the county of Hood and State of Texas, have invented certain new and useful Improvements in Cotton-Choppers, of which the following is a specification.

My invention relates to a new and useful cotton chopper. Its object is to primarily provide a device that will chop cotton mechanically and which will accomplish a considerable saving in time and labor as compared to the performance of this work manually.

The object of the invention stated somewhat more specifically is to provide a machine that will travel along a row of cotton plants, automatically blocking the same into hills and chopping the same to a stand.

Another object is to provide a cotton chopper employing elongated blades as the chopping means, the blades being so disposed that during a stroke, only a small portion of the edge of a blade is cutting at any instant.

A still further object of the invention is to provide a device of the character described that will be strong, durable, simple and efficient and comparatively inexpensive to produce, also one in which the several parts will not be likely to get out of working order.

With the above and other objects in view, the invention has relation to certain novel features of construction and operation, an example of which is described in the following specification and illustrated in the accompanying drawings, wherein:

Figure 1 is a plan view of my cotton chopper. Fig. 2 is a view of the same in front elevation. Fig. 3 is a view of the same in side elevation. Fig. 4 is a vertical sectional elevation, the section being taken upon the line W—W of Fig. 2. Fig. 5 is a detail sectional view of the chopping head, the section being taken upon the line X—X of Fig. 1. Fig. 6 is a detail sectional view showing the transmission gear, the section being taken upon the line Y—Y of Fig. 1. Fig. 7 is another detail sectional view showing a certain portion of the clutch mechanism, the section being taken upon the line Z—Z of Fig. 1.

Referring now more particularly to the drawings, wherein like reference characters designate similar parts in all the figures, the numerals 1, 2 and 3 respectively denote the horizontal center portion, the vertical lateral portions, and the outwardly projecting end portions of the arched axle of my cotton chopper. Upon the end portions 3 of the axle, there is mounted a pair of transporting wheels 4, each of which has a sprocket wheel $4^a$ mounted fast upon its hub. Between the lower extremities of the axle members 2, there is mounted a rectangular frame 5, the opposite rear portions of said frame being rigidly secured to the axle by brackets 6. The tongue 7 of my cotton chopper has its rear extremity centrally surmounted upon the portion 1 of the axle and clamped in a rigid relation thereto as indicated at 8. A rigid relation is established between the front portion of the frame 5 and the tongue by a pair of inclined brace members 9. In order that the distance between the forward end of the frame 5 and the tongue may be capable of some adjustment, the lower ends of the brace members 9 are provided with a plurality of bolt holes as indicated at $9^a$. To further strengthen the upper portion of my frame and assist in holding the same rigid, I extend a pair of brace members 10 from each extremity of the portion 1 of the axle to the tongue. The connection between the members 10 and the axle is established through a pair of brackets 11 best shown in Fig. 3.

A shaft 12 is mounted transversely of the frame 5 in the forward portion of said frame, its extremities being extended laterally some distance beyond the sides of the frame. Upon said projecting end portions of the shaft 12, a pair of sprocket wheels 13 are loosely mounted and are adapted to receive rotation from the sprocket wheels $4^a$ through sprocket chains 14. A pair of brackets 16 mounted upon the frame 5 at each side thereof carry rollers engaging the under sides of the chains 14, said brackets being capable of a vertical adjustment to take up the slack in said chains. Each of the sprocket wheels 13 is formed with an integral clutch member 17 adapted to be engaged by an adjacent sliding clutch member 18 restricted to a rotation with the shaft 12 through a pin 20 projecting through a slot 19 in said clutch member. A pair of coiled springs 21 serve to normally hold the clutch members 18 in engagement with the clutch members 17. By the use of the above described clutch connection, it is made possible when the cotton chopper is being turned for one of the wheels 4 to communicate a rotation to the shaft 12 without a rotation being communicated from the shaft 12 to the other transporting wheel.

Centrally within the frame 5 a shaft 22 is horizontally mounted perpendicular to the shaft 12, the rear end of said shaft being journaled in a bearing 23 secured to the rear end of the frame 5, and the forward end of said shaft being journaled in a bearing 24 centrally secured to a cross-bar 25 transversely extended between the sides of the frame 5. Upon the forward extremity of the shaft 22, a bevel gear 26 is mounted fast being preferably maintained in a rigid relation with the shaft 22 by a set screw. The gear 26 is adapted to engage either of two gears 27 and 28 integrally mounted upon the same face of a circular casting 29 slidably mounted upon the shaft 12. The casting 29 is restricted to a rotation with the shaft 12 by a pin 31 projecting from said shaft through a slot 30 provided in a hub formed integrally with said casting. A coiled spring 32 mounted upon the shaft 12 bears against the free extremity of the hub of the casting 29 and tends to maintain an engagement between one of the gears 27 and 28 and the gear 26. It is necessary to adapt the member carrying the gears 27 and 28 to undergo a sliding displacement first in order that the communication of rotation from the transporting wheels to the shaft 22 may be interrupted and, second in order that either of the gears 27 and 28 may be disengaged from the gear 26 to permit the latter to be displaced upon the shaft 22 so as to bring it into engagement with the other gear. The means for subjecting the member 29 to a sliding displacement includes an angular member comprising two integral arms 33 and 34, the extremity of the former being engaged with a groove in the hub of the member 29, and the latter being formed with a groove 35 through which projects a pin 36 mounted in the bar 25. In the end portion of the member 34 there is also formed a slot 37 receiving a somewhat flattened portion of the shaft 22, the extremity of the slot 37 being reduced in width as indicated at 39. When the member comprising the arms 33 and 34 is subjected to a displacement transverse of the machine such as to disengage the transmission gear, the portion 39 of the slot 37 will come into engagement with the flattened portion of the shaft 22 and will prevent rotation of said shaft. The member 33 is engaged near its juncture with the member 34 by a swinging link 40 having pivotal connection at its other end with one arm of a bell crank 41 pivotally mounted upon the bar 25. The other arm of the bell crank has pivotal connection with one end of a rearwardly extending rod 42, the rear end of which rod is pivotally connected to the lower extremity of a lever 43. A short space above its lower end, the lever 43 is pivotally mounted upon one of the members 2 as indicated at 44. Obviously by subjecting the lever 43 to an angular displacement, the transmission gears will be thrown into or out of mesh. The usual well known device may be provided to hold the lever 43 adjusted in either of its two limiting positions.

Upon the rear portion of the shaft 22, there is mounted fast a chopping head comprising two pairs of oppositely projecting arms $44^a$, each slotted as indicated at $44^b$ and bolted by nuts passing through the said slots to a hub 45 mounted fast upon said shaft. Between the outer extremities of the arm $44^a$ of each pair, there are extended chopping blades 46, which while their extremities are equidistant from the shaft 22 will be inclined at an angle with said shaft such that in making a stroke across the row of plants, one end of the cutting edge of any blade will first contact with the plants, and the entire blade will act upon the row a small portion at a time. This construction eliminates the shock to which the mechanism would be subjected if the blades were parallel to the shaft 22 and exercised a cutting effect along their entire edge at the same instant. The slots $44^b$ permit the distance between the blades 46 to be adjusted. The slotted portions of the arms $44^a$ will preferably be transversely serrated and the serrations will be engaged by serrated washers 47 interposed between said arms and the nuts holding said washers in place. By this construction, the arms $44^a$ are securely restricted against any tendency to shift in their relation to the member 45.

Above the forward extremity of the frame 5, a double-tree 48 is centrally pivoted upon the tongue 7, and the extremities of said double-tree are connected by vertical bars 49 to each side of the front end of the frame as indicated at 51. A plurality of apertures 50 are provided in the bars 49 to permit an adjustment of the distance between the double-tree and the frame 5. The members 51 which establish connection between the bars 49 and the frame 5 will preferably carry coiled springs 52 which will mitigate any shock resulting from the application of draft to the vehicle. Upon the front extremity of the frame 5 a pair of spaced depending bars 53 are mounted fast, said bars being so spaced that they may move closely adjacent to the sides of the row of plants over which my cotton chopper is traveling, so that the operator by guiding his team so as to maintain said bars equidistantly spaced from the sides of the row may keep the cotton chopper accurately centered above the row.

From the foregoing description, it is believed that the manner in which the machine operates will be apparent. By adapting the gear 26 to mesh with either of the two gears 27 and 28, I make it possible to transmit two different speeds from the transporting wheels to the chopping head. The row of plants along which the machine is traveling will be chopped into smaller hills when the chopping head is driven at the more rapid of the two speeds than is the case when the slower speed transmission is in use. The spaces provided between the hills will vary according to the length of the blades 46, sets of blades of various lengths preferably being provided for each machine. The blades will be given a transverse curvature such that any portion of the cutting edge will be transverse with the stalks of the plants in coming into contact with the same. When the chopping head is not rotating, it will preferably be disposed with the arms 44ª in a substantially horizontal position, so that the blades may not contact with the ground, and the locking device previously described will hold said chopping head in the position specified.

The invention is presented as including all such modifications and changes as properly come within the scope of the following claim.

What I claim is:

In a cotton chopper, the combination with a rotating shaft, of hub members fixed on the shaft in spaced relation, a pair of slotted arms mounted on each hub member, the arms of each pair being oppositely directed and each having a serrated face, bolts passing through the slots of the arms and secured in the hub members, fastening devices mounted on the bolts and engaging the serrated faces of the arms, one arm of each pair corresponding with an arm of the other pair but extending radially from the hub member at a different angle, and cutting blades, secured to corresponding arms and extending longitudinally of the shaft at an angle to the longitudinal axis thereof.

In testimony whereof I have signed my name to this specification in the presence of two subscribing witnesses.

MARTIN A. CRUM.

Witnesses:
JEROME M. GROOM,
J. C. MORRISON.

Copies of this patent may be obtained for five cents each, by addressing the "Commissioner of Patents, Washington, D. C."